United States Patent
Jackson

(10) Patent No.: US 9,461,452 B2
(45) Date of Patent: Oct. 4, 2016

(54) CABLE GLANDS

(71) Applicant: Hubbell Limited, London (GB)

(72) Inventor: Carl Jackson, Dukinfield (GB)

(73) Assignee: Hubbell Limited, London (GB)

( * ) Notice: Subject to any disclaimer, the term of this patent is extended or adjusted under 35 U.S.C. 154(b) by 49 days.

(21) Appl. No.: 14/415,182

(22) PCT Filed: Jul. 19, 2013

(86) PCT No.: PCT/GB2013/051941
§ 371 (c)(1),
(2) Date: Jan. 16, 2015

(87) PCT Pub. No.: WO2014/013267
PCT Pub. Date: Jan. 23, 2014

(65) Prior Publication Data
US 2015/0222107 A1    Aug. 6, 2015

(30) Foreign Application Priority Data

Jul. 19, 2012 (GB) .................................. 1212857.5

(51) Int. Cl.
| | | |
|---|---|---|
| *H01B 17/26* | (2006.01) | |
| *H02G 15/013* | (2006.01) | |
| *H02G 15/04* | (2006.01) | |
| *H02G 15/007* | (2006.01) | |

(52) U.S. Cl.
CPC .......... *H02G 15/013* (2013.01); *H02G 15/007* (2013.01); *H02G 15/046* (2013.01)

(58) Field of Classification Search
CPC .......... H02G 3/022; H02G 3/00; H02G 3/02; H02G 3/24; H02G 3/065; H02G 3/0675; H02G 3/088; H02G 3/0625; H02G 15/013; H02G 15/007; H02G 15/046; H02G 15/00; H02G 15/04
USPC ............... 174/650, 655, 135, 653, 651, 652, 174/137 R, 74 R, 142; 385/134, 135; 277/602, 603, 608; 248/56, 73
See application file for complete search history.

(56) References Cited

U.S. PATENT DOCUMENTS

| | | | | |
|---|---|---|---|---|
| 4,150,250 A | * | 4/1979 | Lundeberg | H02G 3/065 174/655 |
| 5,621,191 A | * | 4/1997 | Norris | H02G 3/0675 174/653 |

(Continued)

FOREIGN PATENT DOCUMENTS

| | | |
|---|---|---|
| EP | 0618655 | 10/1994 |
| EP | 0945947 | 9/1999 |

(Continued)

*Primary Examiner* — Angel R Estrada
(74) *Attorney, Agent, or Firm* — Stephen T. Scherrer; Monique A. Morneault; Scherrer Patent & Trademark Law, P.C.

(57) ABSTRACT

A diaphragm seal (101) for a cable gland (FIG. 1) has concentric inner (103) and outer (105) cylindrical seal walls connected at one end by a diaphragm (107) to define a cavity (121). The cavity (121) contains a plurality of support webs (125) that extend between the inner (103) and outer (105) seal walls. The webs (125) are provided on an exit side of the seal (101) and deform to assist insertion of the cable through the seal (101) from an entry side of the seal (101). The webs (12) resist inversion of the seal (101) when the pressure on the exit side is higher than the pressure on the entry side to create a pressure differential across the diaphragm (107).

17 Claims, 6 Drawing Sheets

(56) References Cited

U.S. PATENT DOCUMENTS

| | | | |
|---|---|---|---|
| 6,259,029 B1 * | 7/2001 | Hand | H02G 3/22 174/74 A |
| 6,809,263 B2 * | 10/2004 | Jackson | H02G 3/065 174/651 |
| 8,170,390 B2 * | 5/2012 | Hand | H02G 3/0625 385/134 |
| 8,969,741 B2 * | 3/2015 | Aldrich | H02G 3/088 174/650 |

FOREIGN PATENT DOCUMENTS

| WO | WO 2008/029165 | 3/2008 |
|---|---|---|
| WO | WO 2009/144505 | 12/2009 |

* cited by examiner

CABLE GLANDS

This invention relates to cable glands. The invention has particular, but not exclusive application to cable glands for electric cables. More especially, the invention relates to cable glands for use in flameproof applications.

In the cable gland industry it is known to incorporate seals into cable glands that are suitable for sealing onto the cable to prevent the products of an explosion occurring within a flameproof enclosure to which the cable gland is fitted from passing to the surrounding potentially explosive atmosphere external to the enclosure.

Diaphragm seals are particularly suitable for use in cable glands where a compression seal would be inappropriate, for example where the cable in question would exhibit cold flow under compression. Diaphragm seals also have other advantages; for example with the correct geometry the seal between the cable gland and cable inner insulation can actually be enhanced by the pressure resulting from an explosion.

One known type of diaphragm seal consists of a very hard elastomeric material that is able to provide the forces necessary to act upon the cable to seal against explosion pressures. This type of seal allows the cable to pass in one direction only and is difficult to fit to the cable without damaging the seal.

Another known type of diaphragm seal consists of a flexible elastomeric material (allowing easier cable installation) supported by a separate non-metallic flexible support washer (providing the necessary support to resist the pressure of an explosion). This type of seal is easier to fit to the cable without damaging the seal but the use of a support washer adds to manufacturing costs and problems can arise due to installer error if the washer is omitted or incorrectly fitted.

There is therefore a need for a cable gland having a diaphragm seal that is capable of resisting the pressure of explosion and yet which is compatible with relatively easy cable installation and preferably extraction, as well as being economic to manufacture.

According to a first aspect of the invention, there is provided a cable gland for an electric cable, the cable gland comprising a diaphragm seal locatable within the gland wherein, in use, an electric cable extends through the diaphragm seal, and wherein the diaphragm seal is provided with one or more integral support portions.

The integral support portions may enable the diaphragm seal to adequately resist the forces of an explosion without a separate support washer or the like being necessary while still allowing the seal to be relatively easily fitted to the cable.

It may be that the support portions are deformable so as to reduce the forces required to insert a cable through the diaphragm seal. In this way cable insertion is made easier and there may be a reduced chance of damage occurring to the cable and/or the diaphragm seal when the cable is inserted. Additionally the deformable support portions may allow inversion of the diaphragm seal by pulling the cable backwards if it is desired to remove the cable without damaging the cable sheath or the diaphragm seal allowing the gland to be re-assembled and re-used.

It may be that the diaphragm seal comprises an inner seal wall which defines a through bore suitable for the passage of a cable, and an outer seal wall locatable in the gland with a diaphragm extending between the inner and outer seal walls. The presence of the inner seal wall may allow for a better seal to be achieved around the cable. The outer seal wall may be convenient for securing the diaphragm seal in the body of the gland, for example by retaining the outer seal wall in a bore portion to axially locate the diaphragm seal within the gland. The outer seal wall and/or bore portion may be configured to axially locate and retain the diaphragm seal in the bore portion. For example, the outer seal wall and bore portion may be provided with co-operating formations that engage to axially locate and retain the diaphragm seal in the bore portion. In one arrangement, the outer seal wall may be provided with one or more annular ribs and the bore portion may be provided with one or more annular grooves in which the one or more ribs are received to axially locate and retain the diaphragm seal in the bore portion. Alternatively, the one or more grooves may be provided in the outer wall of the diaphragm seal and the one or more ribs provided in the bore portion. Other arrangements of co-operating formations to axially locate and retain the diaphragm seal relative to a receiving part of the gland body may be employed. The one or more formations on the outer wall of the diaphragm seal may be moulded with the diaphragm seal. The one or more formations on the outer wall of the diaphragm seal may be made of the same or different material as the outer wall.

It may be that the inner and outer seal walls are generally cylindrical and are concentric about a central longitudinal axis of the gland, with the outer seal wall having a greater diameter than the inner seal wall. The inner seal wall may be axially shifted in the direction of the longitudinal axis so as extend beyond the outer seal wall at one end of the seal. The inner seal wall may be partially contained within the outer seal wall and partially extended beyond the outer seal wall.

It may be that the diaphragm extends between the outer seal wall and the inner seal so as to be inclined to the longitudinal axis. For example, the diaphragm may form a cone frustum shape. A cone frustum shape may enhance the seal with the cable under explosion pressures. The cone frustum shape may provide a funnelled area on the cable insertion or entry side of the diaphragm to assist insertion of the cable during installation. The diaphragm may be connected to the outer seal wall at one end of the seal wall or at any position between the ends of the seal wall.

It may be that the diaphragm seal is provided with a series of spaced raised formations such as ribs. The formations may further reduce friction between the cable and the diaphragm seal during insertion of the cable through the diaphragm seal. Thus the formations may reduce the contact area between the cable and the diaphragm seal. Reducing the contact area may help to prevent damage to the diaphragm seal and cable during installation.

It may be that the formations extend in the direction of the longitudinal axis of the diaphragm seal. The formations may extend from or adjacent to one end the diaphragm seal to or adjacent to the other end. For example, the formations may be provided in the funnelled area of the diaphragm and/or in the through bore of the inner seal wall.

In one arrangement, a plurality of support portions are provided in the form of a series of webs circumferentially spaced apart around the longitudinal axis on the cable exit side of the diaphragm. The webs may be disposed in an open cavity formed by the inner and outer seal walls and the diaphragm and may be attached to the inner seal wall and/or the outer seal wall and/or the diaphragm. The webs act as supports for the diaphragm and may provide sufficient strength to prevent the diaphragm inverting under applied explosion pressures. The webs also deform to assist inserting the cable and, when removing the cable, the ribs deform to allow the diaphragm to invert when the cable is pulled backwards to assist removing the cable. In a modification, the support elements may be arranged to form a series of generally U-shaped webs disposed in the cavity between the inner seal wall and the outer seal wall.

The webs may be curved or straight and may be uniformly spaced apart in the circumferential direction. Where the webs are curved, the curvature may be in the same direction, for example clockwise or anticlockwise. Alternatively, one or more webs may be curved in one direction and one or webs may be curved in the opposite direction. The webs may extend part or all of the axial length of the inner seal wall and part or all of the axial length of the outer side wall. Some or all of the webs may have a substantially uniform wall thickness. Alternatively, some or all of the webs may have a variable wall thickness. By varying one or more of the number, shape, length and thickness of the webs, the characteristics of the diaphragm seal can be adapted to withstand different explosion pressures without the seal inverting.

In another arrangement, a plurality of support portions are provided in the form of a series of annular ribs arranged concentrically about the longitudinal axis on the cable exit side of the diaphragm. The ribs act as supports for the diaphragm and may provide sufficient strength to prevent the diaphragm inverting under applied explosion pressures. The ribs may also allow the diaphragm to deform to assist inserting the cable and, when removing the cable, allow the diaphragm to invert when the cable is pulled backwards to assist removing the cable.

The diaphragm seal may be provided with a ring or similar component bonded or moulded onto the outer seal wall that provides a flamepath with the internal section of the part of the cable gland in which the diaphragm seal is received. The ring and internal section may be of similar, preferably complementary, shape, for example straight or tapered in an axial direction. The ring may be metallic, for example a metal or alloy, or non-metallic, for example plastic, or a composite thereof.

The diaphragm seal may be connected to a part of the gland. For example, the diaphragm seal may be connected to part of a cable armour clamp. In one arrangement, an insert may be employed to connect the diaphragm seal to a male component of the cable armour clamp. Alternatively, the diaphragm seal may be connected to a body part of the gland. In one arrangement, the diaphragm seal is received in a bore portion of a gland part, for example an entry adaptor, and co-operating formations are employed to connect the diaphragm seal to the gland part.

According to a second aspect of the invention, there is provided a cable gland for an electric cable, the cable gland comprising a diaphragm seal locatable within the gland wherein, in use, an electric cable extends through the diaphragm seal, and wherein the diaphragm seal is provided with one or more integral guide formations on the cable entry side.

The guide formations may reduce the contact area between the cable and the diaphragm seal during cable insertion so as to reduce friction and making cable insertion easier.

The diaphragm seal may comprise any of the features of the diaphragm seal described above in connection with the first aspect of the invention.

According to a third aspect of the invention, there is provided a cable gland for an electric cable, the cable gland comprising a seal locatable within the gland for sealing engagement with a cable extending through the gland in use, wherein the seal is adapted to provide a flamepath with an internal section of the cable gland.

It may be that the seal is provided with a ring or similar component that forms the flamepath with the internal section of the cable gland. The ring and internal section may be of similar, preferably complementary, shape, for example straight or tapered in an axial direction. The ring may be metallic, for example a metal or alloy, or non-metallic, for example plastic, or a composite thereof.

The seal may be a diaphragm seal and may comprise any of the features of the diaphragm seal described above in connection with the first or second aspects of the invention.

According to a fourth aspect of the invention, there is provided a cable gland for an electric cable, the cable gland comprising a seal locatable within the gland for sealing engagement with a cable extending through the gland in use, wherein the seal is provided with one or more formations for locating the seal relative to a gland part in which the seal is received.

It may be that the seal is received in a bore portion of the gland part. The bore portion and outer wall of the seal may have a matching shape, for example generally cylindrical. The seal may be a sliding fit in the bore portion. The one or more formations may be provided on the outer seal wall for engagement with one or more co-operating formations in the bore portion to axially locate and retain the seal in the bore portion. In this way, the seal is connected to the gland part.

In one arrangement, the outer seal wall may be provided with one or more annular ribs and the bore portion may be provided with one or more annular grooves in which the one or more ribs are received to axially locate and retain the seal in the bore portion. Alternatively, the one or more grooves may be provided in the outer wall of the seal and the one or more ribs provided in the bore portion. Other arrangements of co-operating formations to axially locate and retain the seal relative to a receiving part of the gland body may be employed. The one or more formations on the outer wall of the seal may be moulded with the diaphragm seal. The one or more formations on the outer wall of the seal may be made of the same or different material as the outer wall.

The seal may be a diaphragm seal and may comprise any of the features of the diaphragm seal described above in connection with the first, second or third aspects of the invention.

According to a fifth aspect of the invention there is provided a seal for a cable gland according to any of the first, second, third or fourth aspects of the invention.

The seal may comprise any of the features of the seal described above in connection with the first, second, third or fourth aspects of the invention.

According to a sixth aspect of the invention there is provided a kit of parts for assembly of a cable gland according to any of the first, second, third or fourth aspects of the invention.

Embodiments of the invention will now be described in more detail by way of example only with reference to the accompanying drawings in which.

Figure 1:
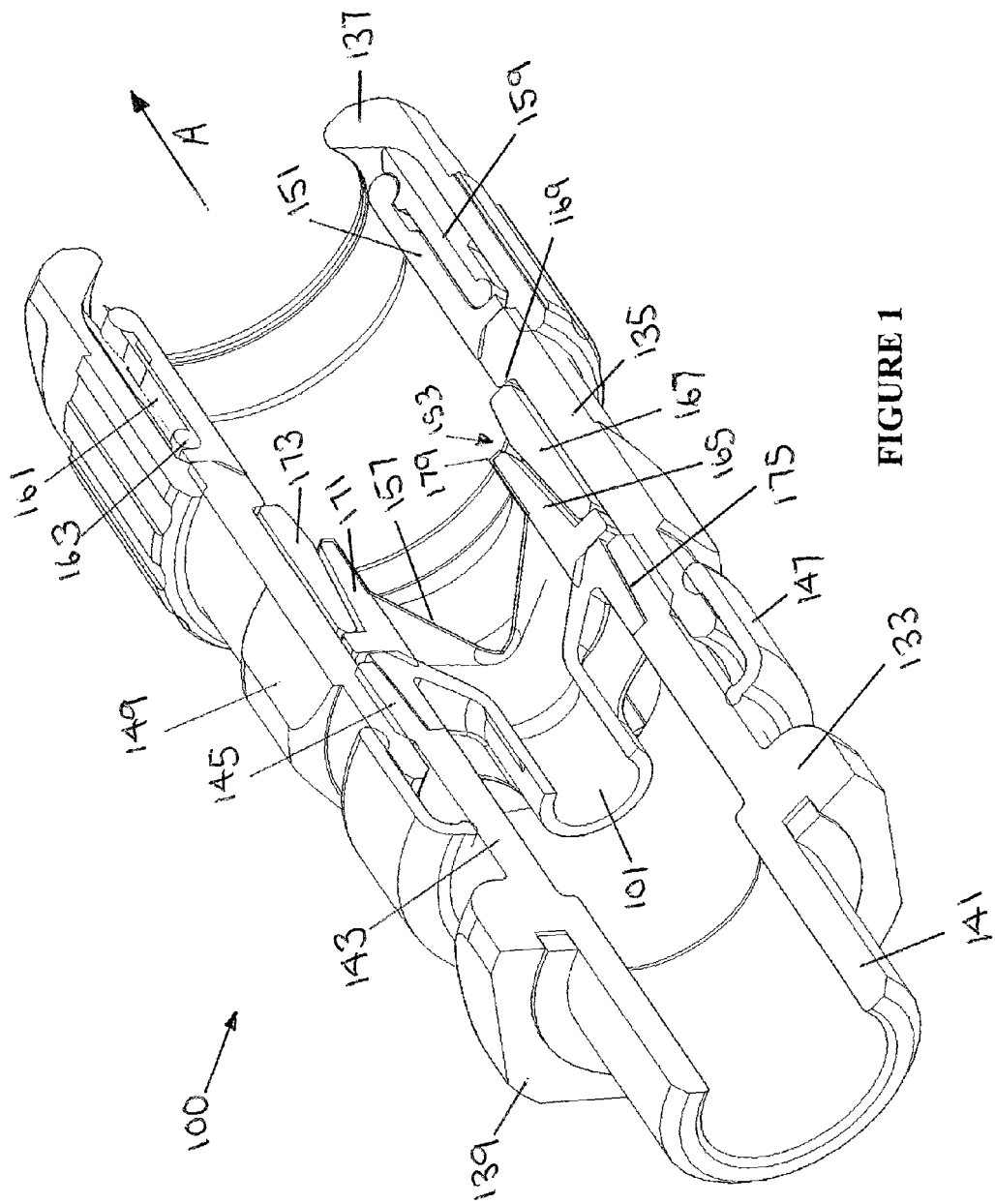
FIG. 1 is a perspective cut away view of a cable gland embodying the invention.
Figure 2:
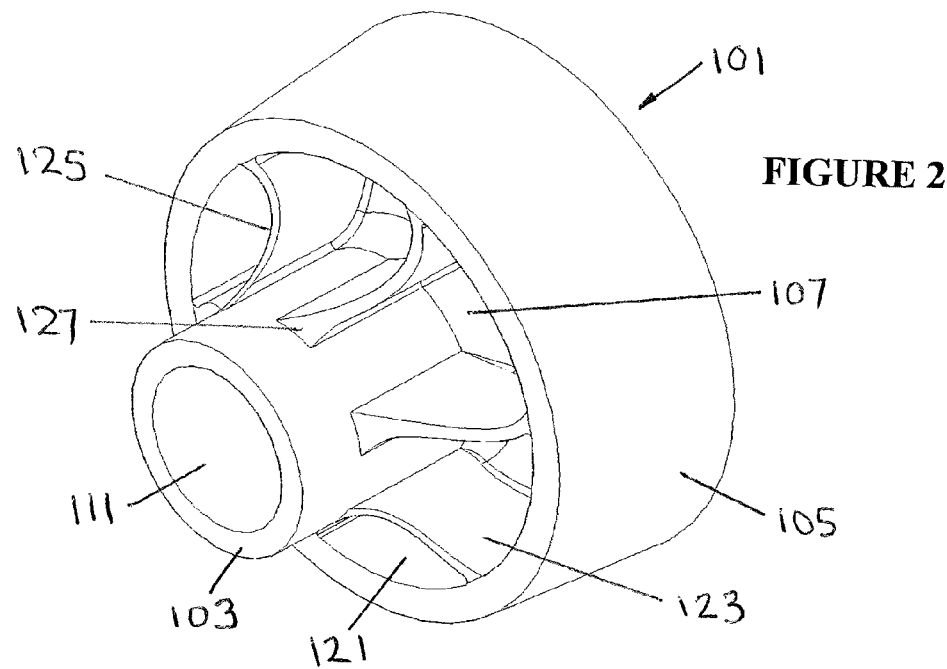
FIG. 2 is a perspective view of the diaphragm seal shown in FIG. 1.

Referring first to FIGS. 1 and 2 a cable gland 100 is shown provided with a diaphragm seal 101 for a cable (not shown) extending through the gland.

As best shown in FIG. 2, the diaphragm seal 101 is a single moulded piece of flexible elastomeric material comprising an inner seal wall 103, outer seal wall 105 and a diaphragm 107 between the two. Both the inner 103 and outer 105 seal walls are substantially cylindrical in shape and are concentric about a central longitudinal axis that is coaxial with the longitudinal axis of the assembled cable gland.

The outer seal wall 105 has a larger diameter than the inner seal wall 103 and the inner seal wall 103 is axially shifted so as to extend beyond the outer seal wall 105 on the cable exit side of the diaphragm seal 101 in the assembled gland. The inner seal wall 103 defines a through bore 111 for passage of the cable and is joined to the outer seal wall 105 by the diaphragm 107 at one end of the diaphragm seal. In this embodiment, the diaphragm 107 extends from the cable entry end of the outer seal wall 105 and the inner seal wall 103 is partially contained within the outer seal wall 105. Other arrangements of the diaphragm 107 are possible.

The diaphragm 107 is inclined relative to the central longitudinal axis so as to be substantially frusto-conical in shape. The diaphragm 107 forms a funnelled area on the cable entry side of the diaphragm seal 101 that assists insertion of the cable through the bore 111 during assembly. The diaphragm 107, the inner seal wall 103 and the outer seal wall 105 define a cavity 121 opening to the cable exit side of the diaphragm seal. The cavity 121 contains a series of spaced support elements 123.

Each support element 123 is formed from a single web 125 extending substantially radially, preferably with a curvature of approximately 80° over its length, from the inner seal wall 103 to the outer seal wall 105 and axially to the diaphragm 107. The webs 125 preferably extend axially from the diaphragm 107 for approximately two thirds of the length of the inner seal wall 103 and for the full length of the outer seal wall 105. The curvature and/or length of the webs 125 may vary.

The webs 125 are preferably uniformly spaced apart in the circumferential direction and are preferably curved in the same direction (anticlockwise or alternatively clockwise from the inner seal wall 103 as viewed in FIG. 2). The webs 125 preferably have a generally uniform wall thickness with flared joining points 127 at the ends where they are joined to outer seal wall 105 and inner seal wall 103. In a modification (not shown), the wall thickness may vary, for example the webs may have a wall thickness that tapers from one seal wall to the other seal wall. In another modification (not shown), the webs may be straight.

The cable gland 1 is shown in FIG. 1 and includes an entry adaptor 133, a sleeve 135 and a cap nut 137 all made from metal, typically brass.

The entry adaptor 133 preferably has an external flange 139 intermediate the ends for engagement by a spanner or similar tool. To one side of the flange 139, the adaptor 133 has an entry portion 141 for insertion into a hole in the wall of an electrical fitting or equipment (not shown) such as a junction box. The entry portion 141 preferably has an external screw thread (not shown) for engagement with a corresponding thread in an enclosure (not shown) to secure the adaptor 133 to the enclosure wall. To the other side of the flange 139, the adaptor 133 preferably has a cylindrical portion 143 leading to an end portion 145.

An annular deluge seal 147 of elastomeric or polymeric material such as neoprene is preferably mounted on the cylindrical portion 143 rearward of an external screw thread (not shown) on the end portion 145. The sleeve 135 has an internal screw thread (not shown) at one end for engagement with the external screw thread on the end portion 145 to connect the sleeve 135 to the adaptor 133. The deluge seal 147 has an axially extending portion that is a clearance fit over the end portion 145 and is engageable with the outer surface of the sleeve 135 to prevent moisture penetrating the interior of the gland 100 along the screw thread connection between the adaptor 133 and sleeve 135.

The sleeve preferably has an external flange 149 intermediate the ends for engagement by a spanner or a similar tool. The other end of the sleeve 135 remote from the adaptor 133 has an external screw thread (not shown) for engagement with an internal screw thread (not shown) on the cap nut 137 to connect the cap nut 137 to the sleeve 135.

In this embodiment, the diaphragm seal 101 is received in a bore portion of the gland, for example a counterbore 175 at one end of the adaptor 133. The gland 100 may further comprise a cable seal 151 housed within the cap nut 137, a cable armour clamp 153 and a protective cap 157.

The cable seal 151 is generally cylindrical and abuts at one end against the sleeve 135. The cable seal 151 is surrounded by a compression member 159 having a plurality of fingers 161 extending axially from a support ring 163. When the cap nut 137 is tightened on the sleeve 135, the fingers 161 are forced to deform in a radially inwards direction urging the cable seal 151 into sealing engagement with the outer sheath of a cable extending through the gland 100. The cable seal 151 may be replaced by any other suitable type of cable seal as will be familiar to those skilled in the art. In some cable glands, it may be that the cable seal 151 is not required and may be omitted.

The cable armour clamp 153 comprises a male component 165 and a female component 167. The male component 165 is locatable against the adaptor 133 to axially retain the diaphragm seal 107 in the counterbore 175. The female component 167 locates against an internal shoulder 169 within the sleeve 135 and is urged axially towards the male component when the sleeve 135 is rotated relative to the adaptor 133 to tighten the gland. Damage to the seal due to overtightening is prevented by engagement of the male component 165 with the end of the entry adaptor 133.

The male component 165 has a conical spigot 171 with an external taper surface and the female component 165 has an annular ring 173 with an internal taper surface. The spigot 171 extends axially within the ring 173 to clamp the armour of a cable extending through the gland between the external and internal taper surfaces when the sleeve 135 is rotated relative to the adaptor 133 to urge the female component 167 in the axial direction relative to the male component 165. The female component 167 may be reversible to present either one of two internal taper surfaces to the external taper surface of the male component 165 for clamping different types and/or sizes of cable armour. The cable armour clamp 153 may be replaced by any other suitable type of cable armour clamp as will be familiar to those skilled in the art. In some cable glands, it may be that the cable armour clamp 153 is not required and may be omitted.

The protective cap 157 is made of a flexible material capable of deforming during assembly and installation of the gland 1 to secure a cable to the junction box. The cap 157 is generally conical with a flange 179 at the open end that seats against the end of the spigot 171 to locate temporarily the cap 157 within the gland 100 for use as an assembly aid when inserting a cable through the gland 100.

The cap 157 receives the cut end of a cable to be passed through the gland 100 and passes with the cable through the diaphragm seal 101 thereby preventing damage to the diaphragm seal 101 by the cut end of the cable. Once the cable has passed through the gland 100, the cap 157 can be removed from the cable and thrown away. The protective cap 157 may be replaced by any other suitable method for protecting the diaphragm seal during assembly as will be familiar to those skilled in the art. In some cable glands, it may be that the protective cap 157 is not required and may be omitted.

In use, the cable is prepared by stripping back an outer sheath or jacket to expose the cable armour surrounding an inner sheath or core surrounding one or more conductors. The armour is then trimmed to the required length for clamping within the gland 100. During assembly, the inner sheath is inserted through the diaphragm seal 101 with the protective cap 157 covering the end of the cable to prevent the cable damaging the seal. The cable is guided towards the bore 111 of the inner seal wall 103 by the funnel shape of the diaphragm 107 and, as the cable is inserted, the webs 125 deform so that the required insertion force may be reduced. In the assembled gland 100, the cavity 121 is open to the cable exit side and the diaphragm 107 and webs 125 are exposed on the cable exit side to an increase in pressure if an explosion occurs in the equipment to which the cable is connected. Under these conditions, the webs 125 support and strengthen the diaphragm 107 so as to resist inversion of the diaphragm seal 101 under the pressure differential across the diaphragm and the increased pressure in the cavity improves the seal between the inner seal wall 103 and the cable and between the outer seal wall 105 and the entry adaptor 133. In this way, the explosion gases which may be potentially hazardous are contained and prevented from escaping to the surroundings. Also smoke or flames from a fire that may result from an explosion are contained and prevented from escaping.

FIGS. 3 to 7 depict a series of alternative diaphragm seals that could be used in the cable gland 100 shown in FIG. 1 in place of the diaphragm seal 101 shown in FIG. 2.

Figure 3:
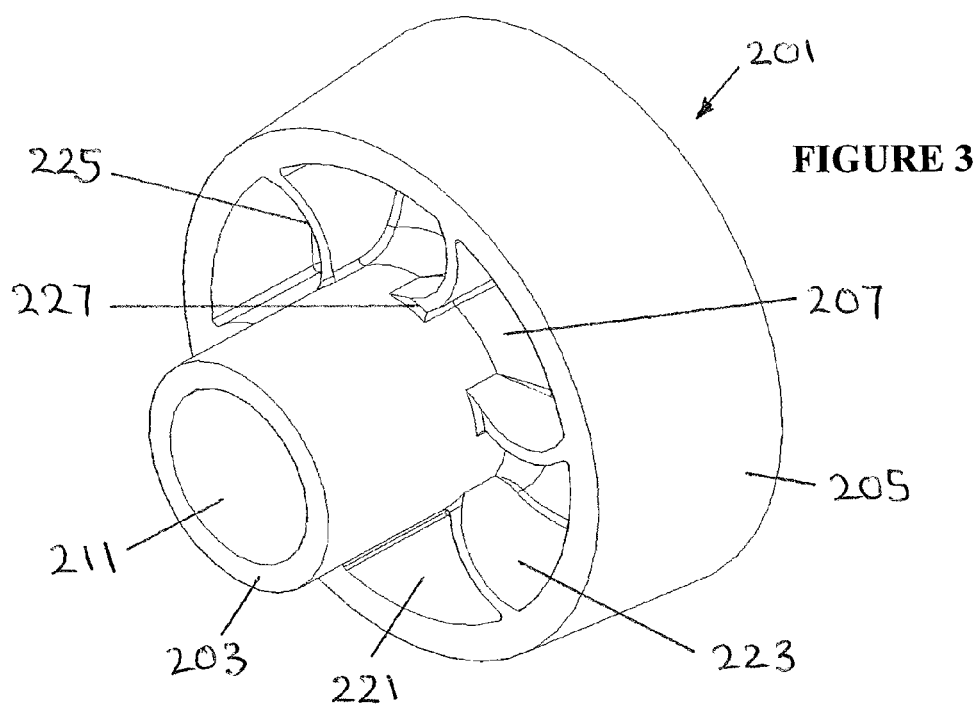
FIGS. 3 to 7 are perspective views of alternative diaphragm seals for use in the cable gland of FIG. 1.

The diaphragm seal 201 in FIG. 3 is generally similar to the seal of FIG. 2, and similar features are provided with like reference numerals in the series 200. In this embodiment, the support elements 223 have been modified such that the webs 225 extend axially from the diaphragm 207 for only approximately one sixth of the length of the inner seal wall 203. In a modification (not shown) the webs may be straight.

Figure 4:
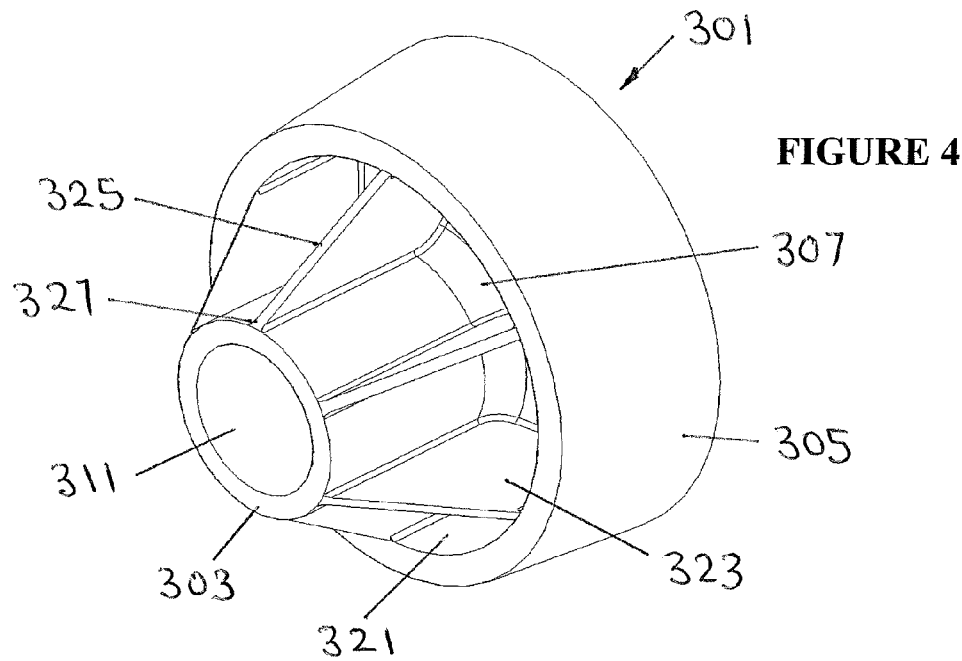

The diaphragm seal 301 in FIG. 4 is generally similar to the previous diaphragm seal embodiments, and similar features are provided with like reference numerals in the series 300. In this embodiment, the support elements 323 have been modified such that webs 325 extend axially from the diaphragm 307 for the whole of the length of both the outer seal wall 105 and the inner seal wall 103. Additionally, there is no noticeable curvature in the radial extension of the webs 325, i.e. the webs 325 are straight. In a modification (not shown), the webs 325 may be curved.

Figure 5:
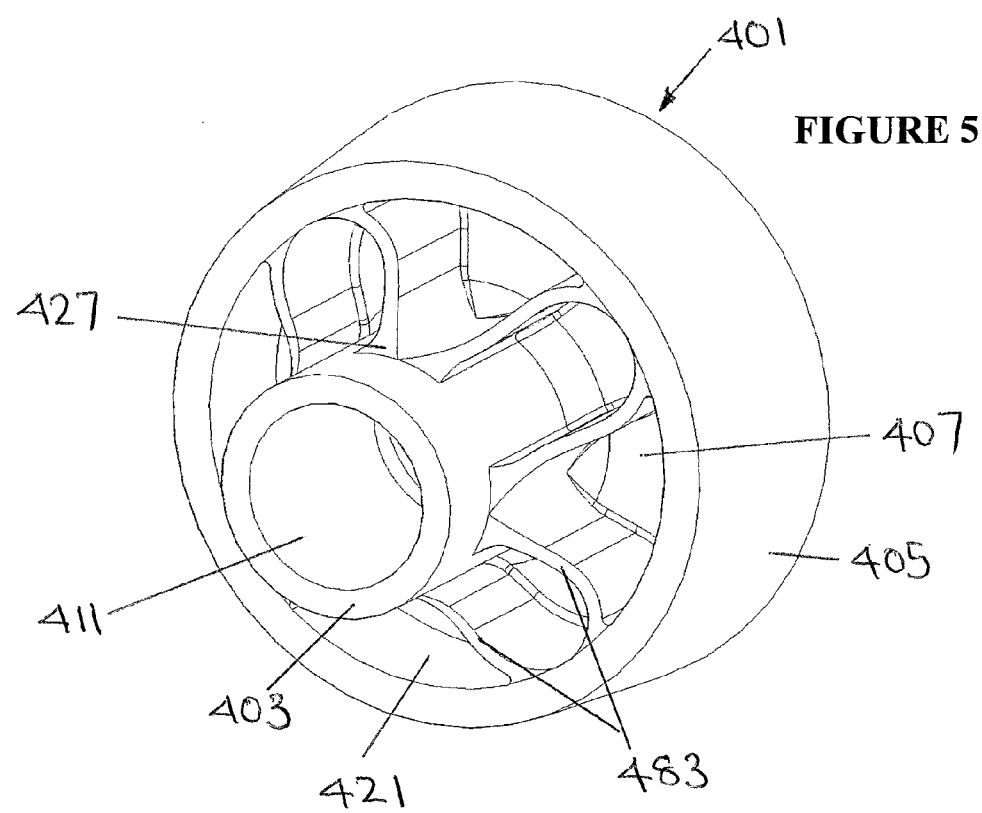

The diaphragm seal 401 in FIG. 5 is generally similar to the previous diaphragm seal embodiments, and similar features are provided with like reference numerals in the series 400. In this embodiment, the support elements 423 are provided in the form of a series of spaced U-shaped webs 481. Each web 481 has a pair of spaced legs 483 extending radially from the inner seal wall 403 and joined by an arching segment 485 at the apex that it is attached to the outer seal wall 405. The webs 481 are attached to the diaphragm 407 and extend axially for the full length of the outer seal wall 405 and for approximately two thirds the length of the inner seal wall 403 where it is within the outer seal wall 403. The legs 483 have a substantially uniform wall thickness with flared joining points 427 at the ends where they are joined to inner side wall 403.

Figure 6:
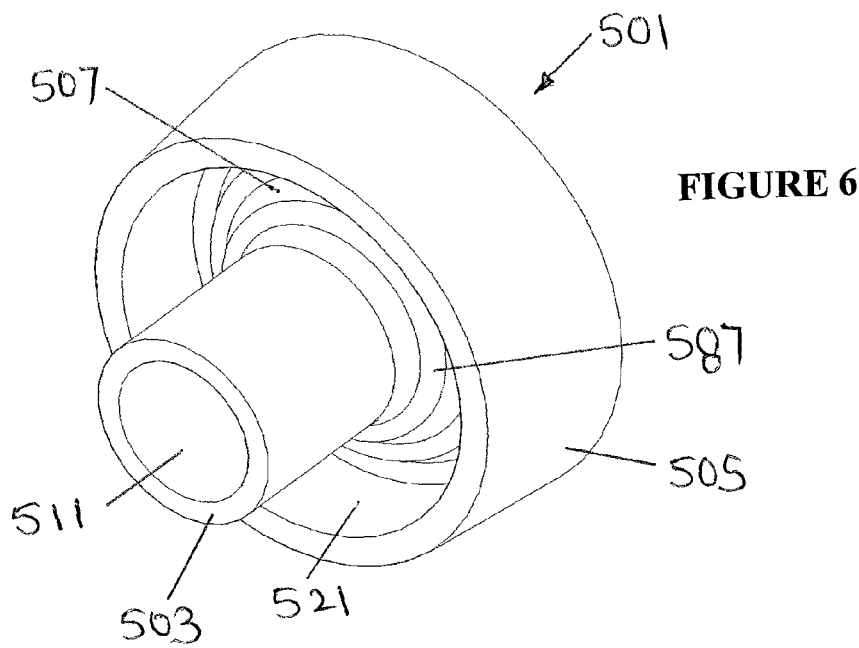

The diaphragm seal 501 shown in FIG. 6 is generally similar to the previous diaphragm seal embodiments, and similar features are provided with like reference numerals in the series 500. In this embodiment, the support elements 523 are provided by a series of spaced concentric ribs 587 integral with the diaphragm 507 in place of the webs of previous embodiments.

Figure 7:
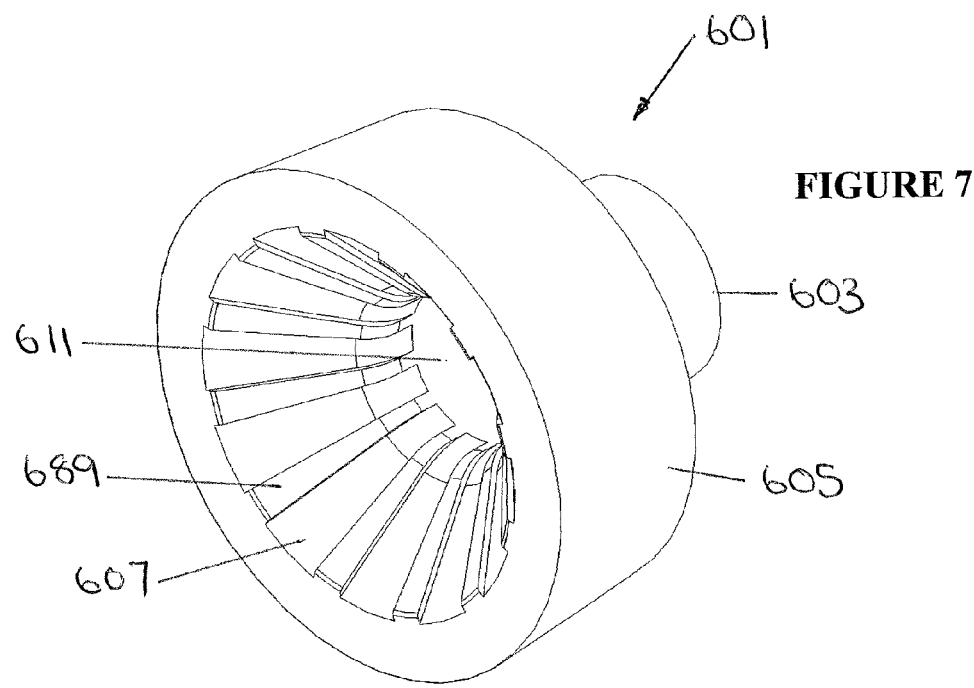

The diaphragm seal 601 shown in FIG. 7 is generally similar to the previous diaphragm seal embodiments, and similar features are provided with like reference numerals in the series 600. In this embodiment the diaphragm seal 601 is provided in the funnel area of the diaphragm 607 on the cable entry side of the seal and in the bore 611 of the inner seal wall 603 with a series of formations such as spaced raised ribs 689 that preferably extend from one end of the diaphragm seal 601 to the other end. The ribs 689 are convergent as they extend from the outer seal wall 605 to the inner seal wall 603 due to the frusto-conical shape of the diaphragm 607 and are then parallel as they extend lengthwise of the inner seal wall 603 due to the cylindrical shape of the through bore 611. The ribs 689 reduce the contact area between the cable and the diaphragm seal 601 and thus provide reduced friction between the diaphragm seal 601 and the cable as the cable is inserted. This allows for the cable to be installed more easily, reducing the likelihood of the diaphragm seal 601 being damaged during cable insertion. In a modification (not shown), the ribs 689 may be confined to the funnelled area of the diaphragm 607 and their height may be tapered as they approach the inner seal wall 603 to give a smooth transition to the through bore 611. Alternatively, the ribs 689 may be confined to the bore 611 of the inner seal wall 603. It will be appreciated that any of the previously described diaphragm seal embodiments may be provided with ribs 689 or other suitable formations similar to FIG. 7 and any of the variants of FIG. 7.

Figure 8:
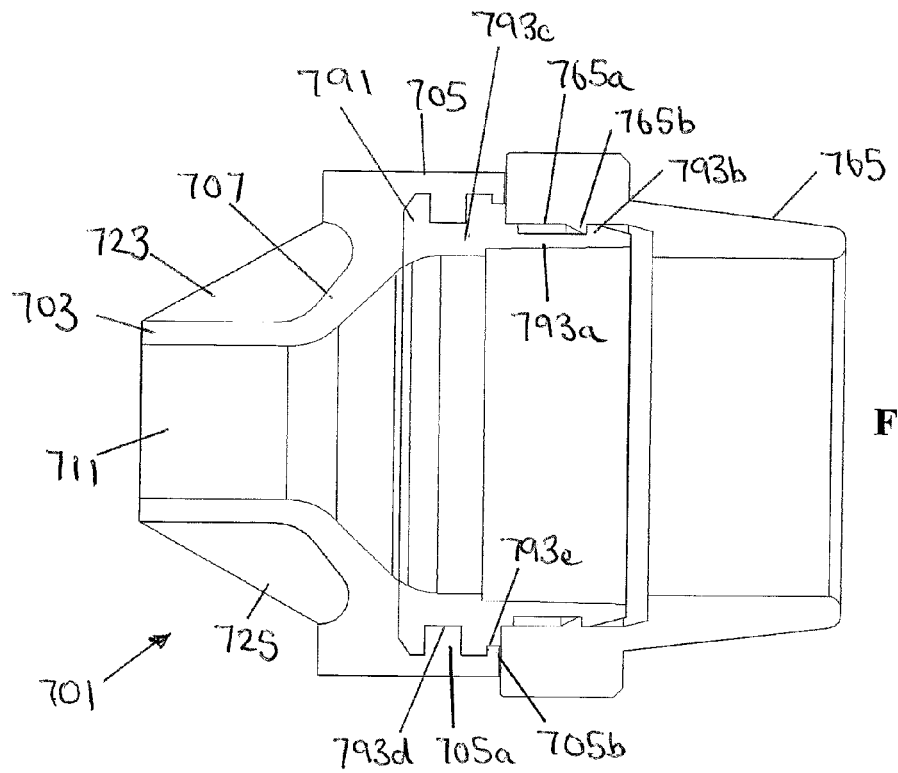
FIGS. 8 and 9 show a modification to the cable gland of FIGS. 1 and 2.
Figure 9:
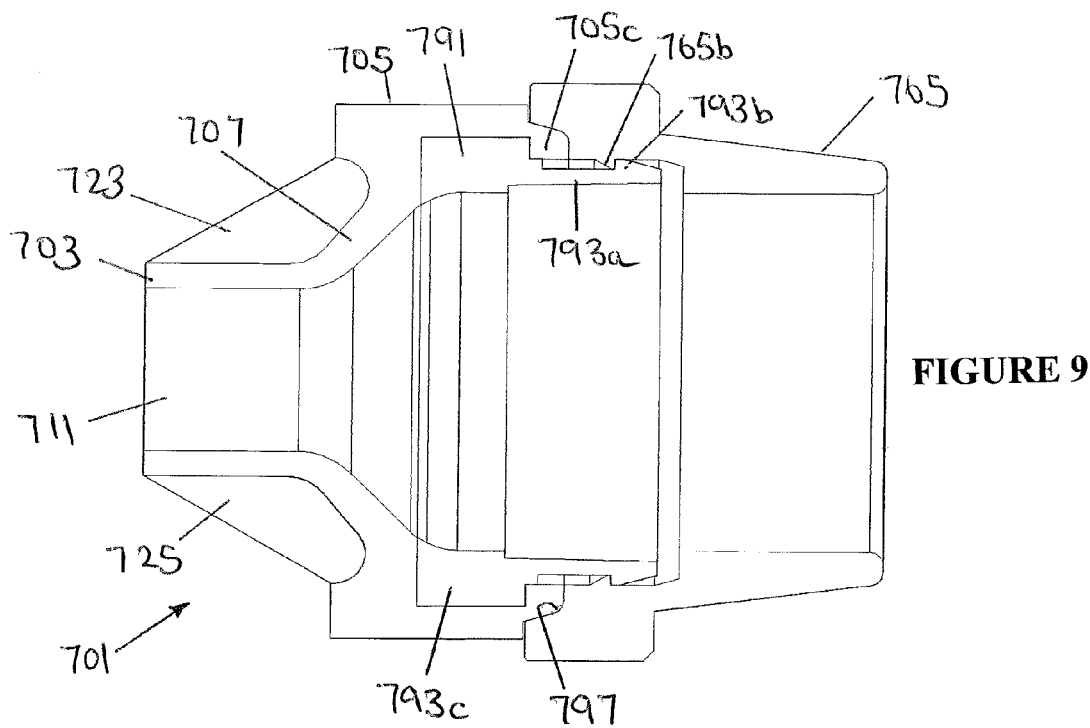

FIGS. 8 and 9 show modifications to the cable gland of FIGS. 1 and 2 in which like reference numerals in the series 700 are used to indicate similar features. In both modifications, the diaphragm seal 701 is connected to the male component 765 of the cable armour clamp by means of an insert 791.

The insert 791 has a tubular body 793 with an end portion 793a that is received in a counterbore 765a of the male component 765 and is retained by engagement of co-operating formations such as an internal annular rib 765b in the counterbore 765a and an external annular rib 793b on the end portion 793a.

The end portion 793a of the insert 791 may be a push fit in the counterbore 765a and the formations 765b,793b may engage with a snap action to resist removal of the end portion 793a from the counterbore 765a. The insert 791 may be made of plastics, for example by moulding, and one or both formations 765b,793b may have a chamfer face to assist engagement of the formations as the end portion 793a is inserted into the counterbore 765a.

Any other means of retaining the end portion 793a in the counterbore 765a may be employed. The retaining means may allow the insert 791 to be separated from the male component 765.

The outer seal wall 705 of the diaphragm seal 701 fits over the other end portion 793c of the insert 791 and is secured to the end portion 793c by engagement of co-operating formations.

In FIG. 8, the end portion 793c of the insert 791 has an annular groove 793d of channel-section and the outer seal wall 705 has an internal rib 705a that is received in the groove 793d. The outer seal wall 705 also has an internal lip 705b at the entry end of the seal 701 that is located in a recess formed between an external abutment shoulder 793e on the end portion 793c and the end face of the male component 765.

In FIG. 9, the insert 791 and male component 765 define an annular recess 797 in which an end portion 705c of the outer seal wall 705 is received. The recess 797 has an entry portion 797a of reduced cross section in which a neck portion 705d of the outer seal wall 705 is received to trap and retain the end portion 705c in the recess 797 when the insert 791 is secured to the male component 765.

In both FIGS. 8 and 9, the diaphragm 707 connects the inner seal wall 703 to the outer seal wall 705 between the ends of the outer seal wall 705 to allow the outer seal wall 705 to fit over the end portion 793c of the insert 791. A plurality of support elements 723 extend between the inner and outer side walls 703,705 on the exit side of the diaphragm 707 as described previously. The support elements 723 comprise webs 725 that extend axially from the diaphragm 707 and are straight although this is not essential and the webs 725 may be curved.

It will be appreciated that any of diaphragm seals described herein may be connected to the male component of the cable armour clamp by means of an insert as described above. The diaphragm seal, insert and male component may be pre-assembled and supplied as a single component to facilitate correct assembly of the gland.

Figure 10:
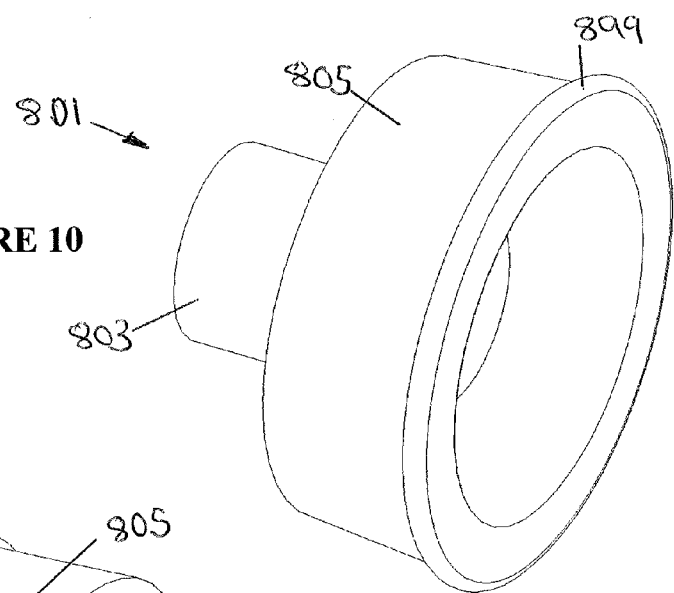
FIGS. 10 to 12 show modifications to the diaphragm seal of FIGS. 1 and 2.
Figure 11:
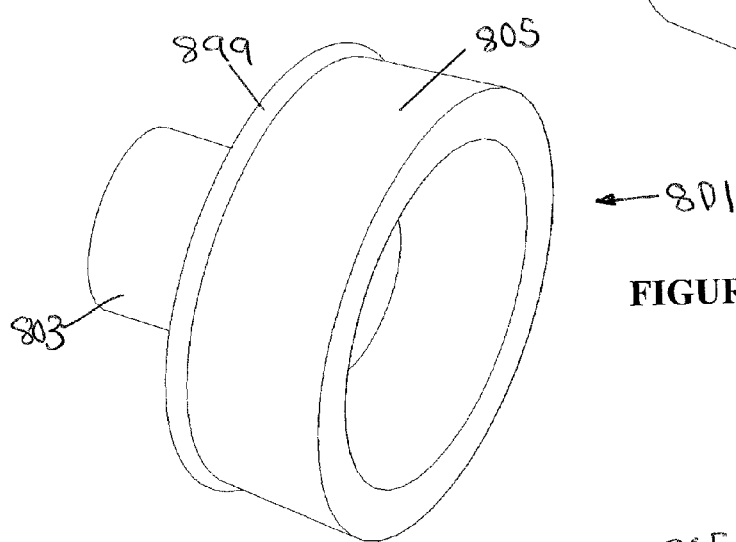
Figure 12:
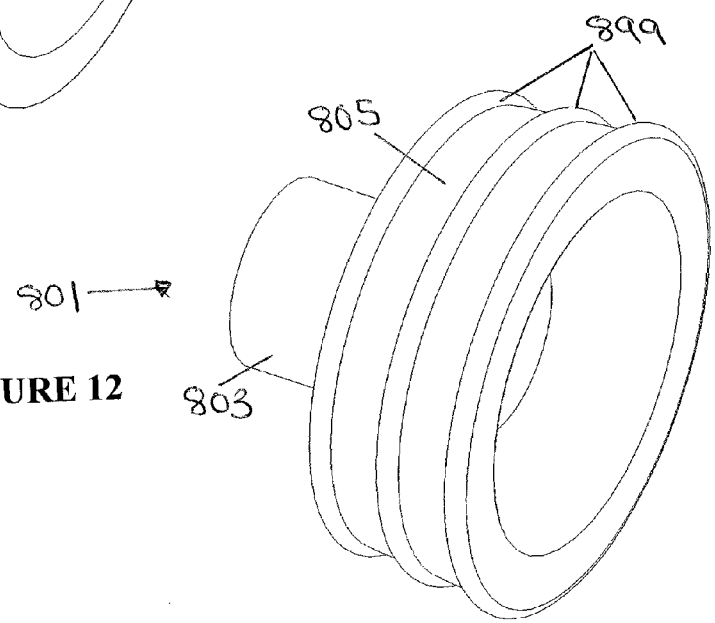

FIGS. 10 to 12 show modifications to the diaphragm seal of the cable gland of FIGS. 1 and 2 in which like reference numerals in the series 800 are used to indicate similar features.

In FIGS. 10 to 12, the outer wall 805 of the diaphragm seal 801 is provided with one or more annular ribs 899. The one or more ribs 899 may be moulded with the diaphragm seal 801 to be integral therewith. In FIG. 10, the outer wall 805 is provided with a single rib 899 at one end. In FIG. 11 the outer wall 805 is provided with a single rib 899 at the other end. In FIG. 12, the outer wall 805 is provided with ribs 899 at both ends and a further rib 899 is provided between the ends. In use, the or each rib 899 engages a groove (not shown) in the inner surface of the counterbore 175 in the entry adaptor 133 of the gland part shown in FIG. 1 to axially locate and retain the diaphragm seal 801 in the counterbore 175. In this way, the diaphragm seal 801 is connected to the entry adaptor 133. The entry adaptor 133 and diaphragm seal 801 may be pre-assembled. It will be understood that the arrangement of one or more ribs 899 and grooves may be reversed with the grooves being in the outer wall 805 of the diaphragm seal 801 and the ribs on the inner surface of the counterbore 175 in the entry adaptor 133. It will also be understood that the number and location of the ribs and grooves may be altered from that shown in FIGS. 10 to 12. Moreover, it will be understood that the one or more ribs and grooves may be replaced by any other suitable co-operating formations configured to axially locate and retain the diaphragm seal 801 relative to the entry adaptor 133 (or any other gland part in which the diaphragm seal 801 is received according to the design of the gland). It will also be understood that the principle of locating the seal in the counterbore by one or more ribs 899 or other formations on the outer wall 805 of the diaphragm seals shown in FIGS. 10 to 12 may be employed in any of the diaphragm seal embodiments shown in FIGS. 3 to 9. Furthermore, it will be understood that the principle of locating the seal in the counterbore shown in FIGS. 10 to 12 may be employed generally in any cable gland having a seal received in a bore portion of a gland part.

In another modification (not shown), any of the diaphragm seal embodiments shown in FIGS. 1 to 12 may be provided with a ring of metal, alloy or plastic material bonded or moulded onto the outer seal wall of the diaphragm seal to extend for all or part of the length of the outer seal wall and provide a flamepath with the internal section of the entry adaptor (or any other part of the gland in which it is received according to the design of the gland). The ring may be straight or tapered with the internal section of the co-operating gland part being of similar shape. It will be understood that the principle of providing the seal with a ring to provide a flamepath with the internal section of a gland part may be employed generally in any cable gland having a seal received in a gland part. As will be apparent from the description of preferred embodiments, in the event of an explosion in the electrical equipment, the design of the diaphragm seal is such that the seal between the inner seal wall and the cable and the seal between the outer seal wall and the entry adaptor is enhanced by an increase in pressure within cavity. It will also be appreciated that the diaphragm seal also prevents the passage of smoke and flames. In addition, the support elements help to prevent the diaphragm seal inverting under the resulting pressure differential that exists across the diaphragm while the design of the support elements nonetheless allows the diaphragm to be inverted to assist cable removal when a force is applied to the cable by pulling the cable backwards in the direction of arrow A (FIG. 1) when it is desired to disassemble the gland for any reason, for example for inspection or maintenance. In summary therefore the diaphragm seal is resistant to inversion in the event of explosion, but passage of the cable through the through bore during cable installation is made relatively easy, as is inversion of the diaphragm should it be necessary to remove the cable without damaging the cable or the diaphragm seal.

It will be understood that the invention is not limited to the embodiments above-described and various modifications and improvements can be made without departing from the various concepts described herein. For example, the webs may extend for part or all the length of the outer seal wall and for part or all the length of the inner seal wall. The webs may be curved or straight. The webs may all be the same shape and length. Alternatively, the webs may have the same shape but different lengths. Alternatively, the webs may have different shapes and the same length. Alternatively, the webs may have different shapes and different lengths. All combinations of web length and shape are envisaged and within the scope of the invention. It should be apparent for example that the diaphragm seal need not necessarily be located in the entry portion and may be located at any suitable location within the cable gland. Additionally the diaphragm seal may be a separate component as depicted here, or it may be joined to or incorporated within the entry adaptor as described or any other suitable component of the cable gland. The ring providing a flamepath with the internal section of the gland may be provided in other seals and is not limited to the diaphragm seals described herein.

While the invention has been described in connection with a cable gland for use with armoured cable, it will be understood that the diaphragm seal may be used in other types of cable gland and we do not intend the invention to be limited to any particular type of cable gland. Furthermore, although the invention has been described in connection with a cable gland for use with electric cables, it will be understood that the diaphragm seal may be used in cable glands for other types of cable such as fibre optic cable, as well as other elongate members including pipes and tubes and the term "electric cable" is used for convenience only and is to be construed as including all such types of elongate members. Any of the features may be employed separately or in combination with any other features and the invention extends to and includes all combinations and sub-combinations of one or more features described herein in any form of diaphragm seal arranged to be used in cable glands.

The invention claimed is:

1. A cable gland for an electric cable, the cable gland comprising a diaphragm seal locatable within the gland wherein, in use, an electric cable extends through the diaphragm seal, wherein the diaphragm seal comprises an inner seal wall which defines a through bore suitable for the passage of a cable, and an outer seal wall locatable in the gland with a diaphragm extending between the inner and outer seal walls, wherein the inner and outer seal walls are generally cylindrical and are concentric about a central longitudinal axis of the gland, with the outer seal wall having a greater diameter than the inner seal wall, and wherein the diaphragm seal is provided with a plurality of integral support portions in the form of a series of webs circumferentially spaced apart around the longitudinal axis on the cable exit side of the diaphragm.

2. The cable gland according to claim 1 wherein, the integral support portions are configured such that the diaphragm seal can resist the forces of an explosion, and wherein the support portions are deformable so as to reduce the forces required to insert a cable through the diaphragm seal and allow inversion of the diaphragm seal by pulling the cable backwards.

3. The cable gland according to claim 1 wherein, the inner seal wall is configured for sealing around the cable and the outer seal wall is configured for securing the diaphragm seal in the body of the gland.

4. The cable gland according to claim 1 wherein, the inner seal wall is axially shifted in the direction of the longitudinal axis so as to extend beyond the outer seal wall at one end of the seal.

5. The cable gland according to claim 1 wherein, the diaphragm extends between the outer seal wall and the inner seal wall so as to be inclined to the longitudinal axis.

6. The cable gland according to claim 1 wherein, the diaphragm seal is provided with a series of spaced raised formations that reduce friction between the cable and the diaphragm seal during insertion of the cable through the diaphragm seal.

7. The cable gland according to claim 1 wherein, the webs are disposed in an open cavity formed by the inner and outer seal walls and the diaphragm.

8. The cable gland according to claim 1 wherein, the webs are attached to the inner seal wall and/or the outer seal wall and/or the diaphragm.

9. The cable gland according to claim 1 wherein, the webs act as supports for the diaphragm to prevent the diaphragm inverting under applied explosion pressures.

10. The cable gland according to claim 1 wherein, the webs deform to assist inserting the cable and, when removing the cable, the webs deform to allow the diaphragm to invert when the cable is pulled backwards to assist removing the cable.

11. The cable gland according to claim 1 wherein, the webs are curved or straight or U-Shaped and/or are uniformly spaced apart in the circumferential direction.

12. The cable gland according to claim 1 wherein, the webs extend part or all of the axial length of the inner seal wall and part or all of the axial length of the outer side wall.

13. The cable gland according to claim 1 wherein, the diaphragm seal is provided with a component bonded or moulded onto the outer seal wall that provides a flamepath with the internal section of the part of the cable gland in which the diaphragm seal is received.

14. The cable gland according to claim 1 wherein the diaphragm seal is a single moulded component of flexible elastomeric material.

15. A cable gland for an electric cable, the cable gland comprising a diaphragm seal locatable within the gland wherein, in use, an electric cable extends through the diaphragm seal, wherein the diaphragm seal comprises an inner seal wall which defines a through bore suitable for the passage of a cable, and an outer seal wall locatable in the gland with a diaphragm extending between the inner and outer seal walls, wherein the inner and outer seal walls are generally cylindrical and are concentric about a central longitudinal axis of the gland, with the outer seal wall having a greater diameter than the inner seal wall, and wherein the diaphragm seal is provided with a plurality of integral support portions in the form of a series of annular ribs arranged concentrically about the longitudinal axis on the cable exit side of the diaphragm.

16. The cable gland according to claim 15 wherein, the ribs act as supports for the diaphragm to prevent the diaphragm inverting under applied explosion pressures.

17. The cable gland according to claim 15 wherein, the ribs allow the diaphragm to deform to assist inserting the cable and, when removing the cable, allow the diaphragm to invert when the cable is pulled backwards to assist removing the cable.

* * * * *